Figures 1, 2:
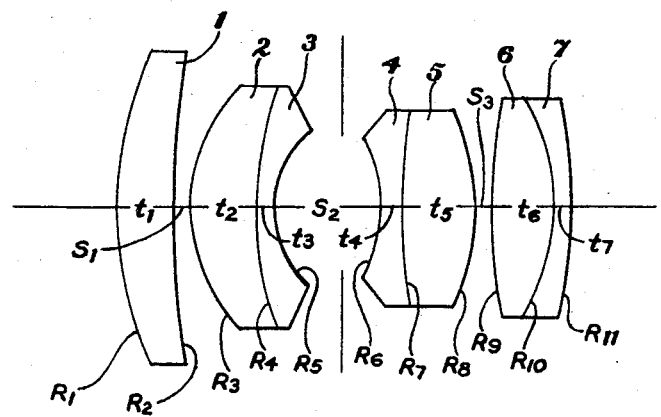

| $f = 100$ mm. | | | | $f/2.0$ |
|---|---|---|---|---|
| Lens | $N_g$ | V | Radii | Thicknesses |
| 1 | 1.7123 | 56.2 | $R_1 = {}^+80.00$ mm | $t_1 = 12.44$ mm. |
|   |        |      | $R_2 = {}^+390.5$ | $S_1 = 3.66$ |
| 2 | 1.652 | 55.5 | $R_3 = {}^+35.95$ | $t_2 = 14.65$ |
| 3 | 1.643 | 36.2 | $R_4 = {}^+73.67$ | $t_3 = 4.04$ |
|   |       |      | $R_5 = {}^+21.86$ | $S_2 = 23.21$ |
| 4 | 1.719 | 30.9 | $R_6 = {}^-35.39$ | $t_4 = 5.73$ |
| 5 | 1.712 | 56.2 | $R_7 = {}^+252.4$ | $t_5 = 15.92$ |
|   |       |      | $R_8 = {}^-47.03$ | $S_3 = 3.66$ |
| 6 | 1.764 | 45.8 | $R_9 = {}^+194.0$ | $t_6 = 13.93$ |
| 7 | 1.631 | 33.8 | $R_{10} = {}^-44.19$ | $t_7 = 4.04$ |
|   |       |      | $R_{11} = {}^-118.6$ | |

Maximilian J. Herzberger
INVENTOR.

BY Daniel D. Mayne
Harold F. Bennett
ATTORNEY & AGENT

| Lens | $N_D$ | V | Radii | Thicknesses |
|---|---|---|---|---|
| \multicolumn{5}{l}{$f=100.6$ mm. (100 mm. without lens 10)   f/3.5} ||||
| 10 | 1.5230 | 58.6 | $R_{12} = +526.9$ mm. | $t_{10} = 8.34$ mm. |
|    |        |      | $R_{13} = +877.8$ | $S_{10} = 3.49$ |
| 11 | 1.6968 | 56.2 | $R_{14} = +81.70$ | $t_{11} = 12.66$ |
|    |        |      | $R_{15} = +417.0$ | $S_{11} = 3.77$ |
| 12 | 1.6384 | 55.5 | $R_{16} = +36.44$ | $t_{12} = 14.88$ |
| 13 | 1.6210 | 36.2 | $R_{17} = +371.7$ | $t_{13} = 4.07$ |
|    |        |      | $R_{18} = +22.77$ | $S_{12} = 23.61$ |
| 14 | 1.6890 | 30.9 | $R_{19} = -36.76$ | $t_{14} = 5.81$ |
| 15 | 1.6968 | 56.2 | $R_{20} = +108.5$ | $t_{15} = 16.11$ |
|    |        |      | $R_{21} = -50.70$ | $S_{13} = 3.77$ |
| 16 | 1.7445 | 45.6 | $R_{22} = +149.4$ | $t_{16} = 14.18$ |
| 17 | 1.6490 | 33.8 | $R_{23} = -121.9$ | $t_{17} = 8.16$ |
|    |        |      | $R_{24} = -94.91$ | |

United States Patent Office 2,878,723
Patented Mar. 24, 1959

2,878,723

HIGH RESOLUTION LENSES FOR MICROPHOTOGRAPHY

Maximilian J. Herzberger, Rochester, N.Y., assignor to Eastman Kodak Company, Rochester, N.Y., a corporation of New Jersey Application July 19, 1957, Serial No. 672,999

4 Claims. (Cl. 88—57)

This invention relates to photographic lenses and particularly to lenses for making microcopies of record photographs, printed documents, maps and similar subject matter.

The object of the invention is to provide a very high aperture lens for copying photographs, documents, maps and other printed matter and similar subjects in a greatly reduced size onto fine-grain photographic film or paper with a high degree of resolution of the details.

The need for a method of copying records of various kinds in a greatly reduced size for storage or for transportation needs no elaboration in this day of rapidly increasing volume of printed and photographic records of all kinds.

A lens for this kind of copying must have fairly equal resolution in different parts of the field. This requirement is quite different from that for landscape or pictorial photography. The ordinary objective for pictorial photography is usually capable of producing good detail in the center of the picture area where the center of interest lies and much lower detail at the edges of the picture. In fact, it has been proposed, for example in U.S. Patent 1,773,335 Ames, to intentionally render the details less distinct at the edges of the picture for artistic purposes.

In making reduced record photographs, however, the detail in all parts of the picture area is required to be substantially the same, and if the lens is capable of rendering sufficient detail for the printed characters to be resolved, then any further improvement in detail in the center of the picture area would be substantially wasted. Of course, if printers were obliging enough to put the fine print at the center of the page, then an improvement in detail in the center of the picture might be an advantage, but traditionally the fine print is at the bottom of a page as in legal contracts or in footnotes in textbooks, and so, if there were to be any difference, the detail in the outer parts of the field should be slightly better than that at the center.

In the early days of the microfilm development, a 10 to 15 times reduction in size was usually enough to please the customer, and reducing a document to ⅕₅–⅓₀ its original size was considered an achievement. The photographic emulsions then generally available would not record any finer detail, and so it was useless for such purposes to improve the lens to produce still finer detail. With the development of fine grain emulsions, however, photographic resolution of several hundred lines per mm. has become a practical possibility and is highly desirable in microphotography of documents. With these new emulsions documents can be copied with a reduction of 60 times and under laboratory conditions perhaps 100 times. Ordinary printed matter runs about 12 printed lines per inch and a minimum of about 10 photographic lines of resolution are required to copy one line of printed matter recognizably. Thus, a resolution of 120 lines per inch or 4.7 lines per mm. in the object space is roughly the requirement and at a reduction of 60 times this would be 282 lines per mm. in the emulsion, while at a reduction of 100 times it would be 470 lines per mm. This degree of resolution is beyond the capabilities of many photographic lenses that are considered to be of high quality, and it even approaches the theoretical limit of resolving power of ordinary lenses. The theoretical limit of resolving power is variously given as $$\frac{0.5}{\sin U'}$$

to $$\frac{1.22}{\sin U'}$$

where $U'$ is the semiangle of the image-forming cone. Taking 0.0006 mm. as the wavelength of yellow light, the resolving power of an $f/3.5$ lens would be 200 to 500 lines per mm., and this is on the basis of lenses in which the aberrations are corrected within a quarter of a wavelength of path length difference (the Rayleigh Limit) and under carefully controlled laboratory conditions. By using ultraviolet light having half the wavelength the resolving power can theoretically be doubled and would then run 400 to 1000 lines per mm.

In recent years it has been realized that in making photographs of a given size greater detail can be achieved in a practical way by making the photograph in two stages. An original negative is made on fast film and in a larger size than the final picture, and then a second negative or the final print is made in a reduced size on a fine-grain emulsion (or paper) under laboratory conditions. It is well known that other things being equal the finer the grain of an emulsion the slower it is, and a very fine grain emulsion is too slow to take pictures under ordinary conditions. This system has been used for example in producing 16 mm. movie films, the originals having been taken on 35 mm. film.

It is also known that lenses covering a narrow angle of field can be highly corrected without too much complexity of structure. For example, telescope objectives commonly have only two or three lens elements and are within the Rayleigh tolerance up to a meter or more in focal length over a field angle of ±0.33°. To copy a page of a book having a 6-inch diagonal at a reduction of 50 times would require a 10-inch lens and a camera bed about 40 feet long. This is objected to on a practical basis and it is required to provide a more complex lens covering a wider field so that the focal length and the camera bed can be made shorter. If the focal length is made too short, however, the angular field of view becomes greater than a high aperture lens of reasonable complexity can cover. There is an optimum region which is believed to correspond to a semiangular field of 8° to 10° in which it is possible to meet the above requirements of resolution over the entire field with a lens of 7 or 8 elements.

For the making of microcopies of record photographs, a very fine-grain emulsion "Spectroscopic 458–GH" sold by the Eastman Kodak Co. on spectroscopic plates has been considered. This emulsion has a resolving power of 2000 lines per mm. but it is many times slower in speed than ordinary emulsions. Even the best photographic lenses now on the market are not capable of giving a resolving power sufficiently high to take advantage of this emulsion, and in fact, it is beyond the theoretical limit of resolution of a perfectly corrected $f/3.5$ lens. However, it appeared feasible to use a modification of this emulsion which would be several times faster than the spectroscopic plates and which would have about ¼ to ½ the resolution thereof and to aim at a resolution of 500 or 600 lines per mm. in the image formed by the lens. With such an arrangement the lens would be working very close to its theoretical possible limit of resolving power, and this would be approximately equalled by the resolving power of the emulsion so as to take advantage of the maximum speed possible. That is to say, the use of an emulsion with resolving power substantially greater than 500 to 600 lines per mm. would involve loss of speed without being of any advantage with respect to resolving power because the image formed by the lens would not show any more detail than that. With these considerations in mind, a resolving power of about 500 to 600 lines per mm. in the reduced image was selected as the best compromise. While this will make possible the storage of printed information at a reduction of 100 diameters, a more immediate demand arose for the copying of record photographs having detail of 20 lines to 100 lines per mm. in the original and with an approximately uniform degree of resolution over the full field of view. Thus, the problem presented is analogous to that of copying printed matter except that the magnifications range from 5 to 25 times. However, it is contemplated to provide a further lens with 100 times reduction for copying printed matter, X-ray records and other material having coarser detail in the original.

From the lens design point of view, it is well known that photographic lenses tend to have more strongly overcorrected spherical aberration toward the edge of the field than in the center of the field. While this is not the only reason for the deterioration of detail at the edge of the field, I have discovered that the resolution can be made more uniform by correcting the objective to have undercorrected spherical aberration at the center of the field, thereby worsening the resolving power in this area but at the same time balancing part of the overcorrected higher-order spherical aberration near the edge of the field and improving that part of the image more nearly into equality with the center of the field. In a similar manner, there is an unsymmetrical aberration in off-axis image points so that such an image commonly appears as a small bright nucleus surrounded by a nebulous flare which reminds one of butterfly wings in shape. I have discovered that this high-order flare can be balanced to a useful degree by ordinary sine condition coma of the opposite sign and that this results in a little larger nucleus with much more light concentrated in it and much smaller butterfly haze around the nucleus. The first type of image with the very small neclus can give a high resolution but the haze around the nucleus tends to reduce the contrast and the loss of light from the nucleus tends to require longer exposures to register the best image. In any case in which the small nucleus type of image gives higher resolution than is required, I have discovered that a considerable advantage can be gained by introducing ordinary coma of the opposite sign and making the nucleus of the off-axis image larger but with more light concentrated in it instead of in the surrounding haze.

There is one more direction in which improvement can be made and that is by increasing the theoretical limit of the resolving power by using light of a shorter wavelength. This has long been known in microscopy and is the principal if not the only advantage of the ultraviolet microscope. In ordinary photography, such a modification is not practical because the appearance of ordinary objects is changed considerably when photographed in ultraviolet light, and particularly in color photography it is difficult or impossible to retain an acceptable color balance. Moreover, in landscape photography, the ultraviolet light is absorbed or scattered by the atmosphere to such an extent that distant objects may become practically invisible. However, in the process for which the lenses of the present invention are intended, the copying is done from a black-and-white original and in studio or laboratory conditions under which the path length of light through the air is not very long. Moreover, the use of violet or ultraviolet light takes advantage of the greater sensitivity of these photographic emulsions to the shorter wavelengths. On the other hand, in projecting such microphotographs for visual examination, it is not usually practicable to use ultraviolet or deep violet light, and so visible light is used for this purpose. Of course, in whatever color or wavelength of light the objective is intended to be used, the designer uses the refractive index of the various lens elements for that particular wavelength in designing the lens, so that if a lens is made up for photographing documents in deep violet light, it may be necessary to modify the design to some extent to make a projection lens meeting the critical requirements in this field of use.

According to the invention, a vary highly corrected objective for photographic or projection purposes is made up comprising two negative meniscus doublets concave toward each other and axially aligned between a front positive meniscus component concave toward the rear and a biconvex rear doublet having a cemented surface of positive power concave toward the front. I find that this type of objective is capable of giving a very high degree of detail on the axis and out to about 8° or 10° from the axis when working at apertures of $f/3.5$ up to about $f/2$. A lens of this general type corrected for ordinary photographic purposes but with the rear surface plano rather than convex is described in my Patent No. 2,350,035.

According to the invention, the above-described type of objective is modified to give the undercorrected aberration and negative coma according to the invention by making the radii of curvature of the glass air surfaces within the limits indicated by the following algebraic inequalities:

$$0.70\ F < +R_1 < 0.88\ F$$
$$2.5\ F < +R_2 < 8\ F$$
$$0.33\ F < +R_3 < 0.39\ F$$
$$0.20\ F < +R_5 < 0.24\ F$$
$$0.32\ F < -R_6 < 0.39\ F$$
$$0.42\ F < -R_8 < 0.53\ F$$
$$1.2\ F < +R_9 < 3.3\ F$$
$$0.80\ F < -R_{11} < 1.50\ F$$

In this table the radii of curvature R are numbered through the five components consecutively from front to rear by subscripts, and the + and − signs indicate surfaces respectively convex and concave to the front. The radii $R_4$, $R_7$ and $R_{10}$ of the cemented surfaces are omitted from the table because cemented surfaces are primarily introduced into optical systems for color correction, particularly if they are located between two lens elements having nearly the same refractive index (as originally proposed in Patent No. 538,182 Rudolph). The radii of curvature of such surfaces are determined by the requirements of color correction and according to well-known methods such as the one described in "Fundamentals of Optical Engineering" by Jacobs, N.Y., 1943, page 409. The radius determined for any particular surface by these methods will differ somewhat according to the dispersive indices of the glasses and wave length of light in which the lens is to be used. The cemented surface in the rear component is concave toward the front and is given positive power as in the prior art to aid in correcting the higher order coma spoken of above. Preferably the radius of curvature thereof is between 0.4 F and 1.5 F where F is the equivalent focal length of the four-component lens taken as a whole. In the two meniscus doublets, I prefer to choose glasses such that cemented surfaces do not have very strong curvature and thus are comparatively economical to produce, a radius of either sign greater than 0.5 F being considered acceptable. The front component is a simple lens element or optionally a cemented doublet. The thickness of each meniscus doublet is preferably between 0.14 F and 0.25 F, and the overall length of the four-component assembly is preferably between 0.9 F and 1.2 F.

The refractive indices of the positive elements are preferably each between 1.6 and 1.9 and average greater than 1.68 to aid in obtaining a flat image field with small degree of astigmatism throughout. The negative elements are preferably between 1.56 and 1.80 in index.

According to a highly preferred embodiment of the invention, the refractive indices N for the wavelength of light for which the lens is intended to be used are within the limits set forth in the following algebraic inequalities:

$$1.68 < N_1 < 1.74$$
$$1.62 < N_2 < 1.69$$
$$1.61 < N_3 < 1.67$$
$$1.69 < N_4 < 1.75$$
$$1.68 < N_5 < 1.74$$
$$1.73 < N_6 < 1.80$$
$$1.60 < N_7 < 1.66$$

In the accompanying drawing:

Fig. 1 shows in diagrammatic axial section an objective according to the invention.

Fig. 2 gives constructional data for one specific example of the objective shown in Fig. 1.

Figures 3, 4:
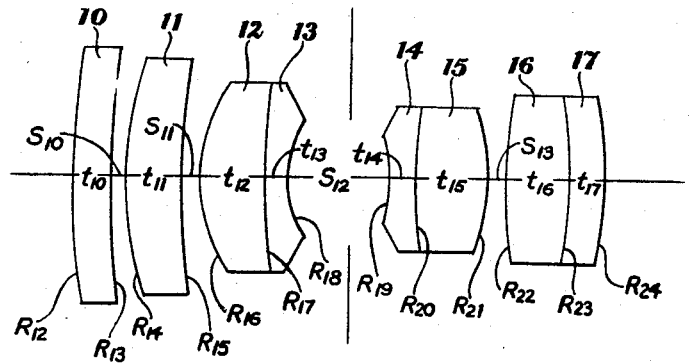

Fig. 3 shows a modified form of the invention in which an added element is provided in front of the objective after the manner of a portrait attachment for use at finite conjugates.

Fig. 4 gives constructional data for one specific embodiment of the objective with added component as shown in Fig. 3.

Fig. 1 shows an objective made up of seven lens elements 1 to 7 and comprising a front positive meniscus component 1, a negative meniscus component 2, 3 therebehind, a central airspace $S_2$ in which a diaphragm may be located, a second negative meniscus component 4, 5 and a rear biconvex positive component 6, 7. The three meniscus components are all concave toward the central airspace $S_2$, and the cemented surface in the rear component is concave toward the front in accordance with the invention.

Fig. 2 is a table of constructional data for a specific example of the objective shown in Fig. 1 designed for use at 19-to-1 magnification. This data is as follows:

*Example 1*

[f=100 mm.    f/2.0.]

| Lens | $N_g$ | V | Radii, mm. | Thicknesses, mm. |
|---|---|---|---|---|
| 1 | 1.7123 | 56.2 | $R_1 = + 80.00$ | $t_1 = 12.44$ |
|   |        |      | $R_2 = +390.5$ | $s_1 = 3.66$ |
| 2 | 1.6525 | 55.5 | $R_3 = + 35.95$ | $t_2 = 14.65$ |
| 3 | 1.6431 | 36.2 | $R_4 = + 73.67$ | $t_3 = 4.04$ |
|   |        |      | $R_5 = + 21.86$ | $s_2 = 23.21$ |
|   |        |      | $R_6 = - 35.39$ | $t_4 = 5.73$ |
| 4 | 1.7189 | 30.9 | $R_7 = +252.4$ | $t_5 = 15.92$ |
| 5 | 1.7120 | 56.2 | $R_8 = - 47.03$ | $s_3 = 3.66$ |
|   |        |      | $R_9 = +194.0$ | $t_6 = 13.93$ |
| 6 | 1.7645 | 45.8 | $R_{10} = - 44.19$ | $t_7 = 4.04$ |
| 7 | 1.6311 | 33.8 | $R_{11} = -118.6$ |  |

In this and the tables below, as in the drawings, the lens elements are numbered consecutively from front to rear in the first column, the refractive index N is given in the second column for light of approximately the wavelength for which the objective is intended to be used, the wavelength being indicated by the subscript of N according to the customary designation of the spectral line. (The "g" line of 4227 Angstroms is used in Examples 1 and 3 and "D" or 5893 Angstroms in Example 2.) The conventional dispersive index V is given in the third column and the radii of curvature R of the lens surfaces, the thicknesses t of the lens elements and the spaces s between the lens components, each numbered by subscripts from front to rear, are given in the last two columns. The front of the objective is toward the longer conjugate, as customary.

Fig. 3 shows a similar objective except that an added element 10 has been provided in front of it to make it easier to focus the system at finite conjugates. Although I have never seen any published description of a portrait attachment used in front of a 7-element objective of this type, it is well known to use such attachments with photographic objectives in general as shown, for example, on p. 358 of the well-known "Handbuch der Photographie," vol. 1 "Das Photogranisch Objective" by Merte, Richter and Von Rohr, Vienna, 1932. I attach no particular significance to the use of this sort of an attachment with a lens of this type, except that in this case the objective is corrected in combination with the attachment during the design thereof. In every-day use, when an objective is designed for use at infinite conjugates it may be used at finite conjugates by racking out the objective farther from the photographic film plane, but the fine resolution of the lens is usually maintained better by attaching a portrait attachment whose focal length is roughly equal to the distance of the object which is to be photographed so that the objective itself works in collimated light as originally designed. Anologously, when an objective has been designated for use at infinity, there is likely to be less redesigning to be done if a component is added such as a portrait attachment roughly collimating the light for the main objective. It is interesting to note that in Fig. 3 the portrait attachment is located substantially at the front principal focal plane and so it has an extremely small effect on the equivalent focal length of the system. By removing the added element 10 an objective is obtained which, according to ordinary standards, is well corrected for use with distant objects.

Fig. 4 is a table, repeated below, giving constructional data for a specific example of the form of the invention shown in Fig. 3. This objective has a focal length of 100 mm. without and 100.56 with the front element 10. The relative aperture is f/3.5.

*Example 2*

| Lens | $N_D$ | V | Radii, mm. | Thicknesses, mm. |
|---|---|---|---|---|
| 10 | 1.5230 | 58.6 | $R_{12} = +526.9$ | $t_{10} = 8.34$ |
|    |        |      | $R_{13} = +877.8$ | $s_{10} = 3.49$ |
| 11 | 1.6968 | 56.2 | $R_{14} = + 81.70$ | $t_{11} = 12.66$ |
|    |        |      | $R_{15} = +417.0$ | $s_{11} = 3.77$ |
| 12 | 1.6384 | 55.5 | $R_{16} = + 36.44$ | $t_{12} = 14.88$ |
| 13 | 1.6210 | 36.2 | $R_{17} = +371.7$ | $t_{13} = 4.07$ |
|    |        |      | $R_{18} = + 22.77$ | $s_{12} = 23.61$ |
|    |        |      | $R_{19} = - 36.76$ | $t_{14} = 5.81$ |
| 14 | 1.6890 | 30.9 | $R_{20} = +108.50$ | $t_{15} = 16.11$ |
| 15 | 1.6968 | 56.2 | $R_{21} = - 50.70$ | $s_{13} = 3.77$ |
| 16 | 1.7445 | 45.6 | $R_{22} = +149.4$ | $t_{16} = 14.18$ |
| 17 | 1.6490 | 33.8 | $R_{23} = -121.9$ | $t_{17} = 8.16$ |
|    |        |      | $R_{24} = - 94.91$ |  |

In this example, lens element 10 is the added element as above described and the objective proper is made up of elements 11 to 17. Element 10 has a focal length of about 2.5 meters. This system is intended as a projection lens for use in visual light, that is, it is corrected for the yellow D line of sodium and is intended for use at a magnification of 25 : 1, the distance from the object to the first vertex being about 2.5 meters so that the light from the object point is almost exactly collimated as it enters the main objective.

As a third example, data is given in the table below for a second specific embodiment of the invention as shown in Fig. 3. This objective has a focal length of 100 mm. without and 102.0 mm. with the front element 10. The relative aperture is $f/1.7$.

Example 3

| Lens | $N_e$ | V | Radii, mm. | Thicknesses, mm. |
|---|---|---|---|---|
| 10 | 1.5348 | 58.6 | $R_{12}=+143.6$ | $t_{10}=9.95$ |
|    |        |      | $R_{13}=+210.8$ | $s_{10}=1.99$ |
| 11 | 1.7123 | 56.2 | $R_{14}=+80.00$ | $t_{11}=12.44$ |
|    |        |      | $R_{15}=+390.5$ | $s_{11}=3.66$ |
| 12 | 1.6525 | 55.5 | $R_{16}=+35.95$ | $t_{12}=14.65$ |
| 13 | 1.6431 | 36.2 | $R_{17}=+73.67$ | $t_{13}=4.04$ |
|    |        |      | $R_{18}=+21.86$ | $s_{13}=23.21$ |
| 14 | 1.7189 | 30.9 | $R_{19}=-35.67$ | $t_{14}=5.73$ |
| 15 | 1.7120 | 56.2 | $R_{20}=+138.2$ | $t_{15}=15.92$ |
|    |        |      | $R_{21}=-47.55$ | $s_{15}=3.66$ |
| 16 | 1.7645 | 45.8 | $R_{22}=+184.8$ | $t_{16}=13.93$ |
| 17 | 1.6311 | 33.8 | $R_{23}=-44.71$ | $t_{17}=4.04$ |
|    |        |      | $R_{24}=-120.2$ |               |

This table is arranged as the second one above. This objective is corrected for use in deep violet and near-ultraviolet wavelengths ranging from about 4200 Angstroms to about 4100 Angstroms and for use at a magnification of 5.3:1. The focal length of the added component on the front is 800 mm. The distance from the object to the front vertex of the added element is about 540 mm. and that from the rear surface of the lens to the image plane is about 60 mm.

Examples 2 and 3 have been given on a scale of 100 mm. focal length for the main objective comprising the last four components 11 to 17 to facilitate comparison with Example 1 and with other art. It will be readily apparent from the tables that all three examples fall within the stated ranges with respect to radii of curvature of the glass-air surfaces and of the cemented surface of the rear component as given in the statement of the invention and also the refractive indices are within the preferred ranges. The two "buried" surfaces $R_4$ and $R_7$ are both convex to the front, but I attach no particular importance to this because, as pointed out above, these curvatures could be considerably changed merely by making up the lens using a different glass with substantially the same refractive index but different dispersive index.

An aperture stop is intended to be placed in the central space about 14 or 15 mm. from the front end of the space in each case.

I claim:

1. A photographic objective for copying record photographs, printed matter and the like on a reduced scale comprising two negative meniscus doublets concave toward each other and axially aligned between a front positive meniscus component concave toward the rear and a biconvex rear doublet having a cemented surface of positive power concave toward the front, in which the radii of curvature R of the lens surfaces numbered by subscripts from front to rear are within the limits set forth in the following table of algebraic inequalities:

$$0.70\ F<+R_1<0.88\ F$$
$$2.5\ F<+R_2<8\ F$$
$$0.33\ F<+R_3<0.39\ F$$
$$0.5\ F<\pm R_4\leq\infty$$
$$0.20\ F<+R_5<0.24\ F$$
$$0.32\ F<-R_6<0.39\ F$$
$$0.5\ F<\pm R_7\leq\infty$$
$$0.42\ F<-R_8<0.53\ F$$
$$1.2\ F<+R_9<3.3\ F$$
$$0.4\ F<-R_{10}<1.5\ F$$
$$0.80\ F<-R_{11}<1.5\ F$$

where F is the focal length of the four-component assembly and where the + and − values of the radii R denote surfaces respectively convex and concave toward the front, in which the refractive index of each positive element is between 1.6 and 1.9, the average thereof being greater than 1.68, in which the refractive index of each negative component is between 1.56 and 1.80, in which the thickness of each negative meniscus component is between 0.14 F and 0.25 F and in which the overall length of the four component assembly is between 0.9 F and 1.2 F, the spherical aberration being undercorrected at the center of the field for balancing normally overcorrected spherical aberration at the edge of the field whereby a uniformly high degree of resolution is obtained in all parts of a field of view extending approximately 10° from the axis.

2. An objective according to claim 1 in which the refractive indices N of the respective lens elements for the mean wavelength of the light in which the lens is used are between the following limits $$1.68<N_1<1.74$$
$$1.62<N_2<1.69$$
$$1.61<N_3<1.67$$
$$1.69<N_4<1.75$$
$$1.68<N_5<1.74$$
$$1.73<N_6<1.80$$
$$1.60<N_7<1.66$$

where the subscripts refer to the positive element of the front component and the two elements of each of the respective doublets numbered in order from front to rear.

3. An objective according to claim 2 corrected for use at finite conjugates in combination with an additional positive component in front thereof, the focal length of the additional component being roughly equal to the longer conjugate distance.

4. An objective according to claim 1 corrected for use at finite conjugates in combination with an additional positive component in front thereof, the focal length of the additional component being roughly equal to the longer conjugate distance.

References Cited in the file of this patent

UNITED STATES PATENTS

| | | |
|---|---|---|
| 1,786,916 | Merte | Dec. 30, 1930 |
| 2,262,998 | Frederick et al. | Nov. 18, 1941 |
| 2,350,035 | Herzberger | May 30, 1944 |
| 2,466,424 | Herzberger | Apr. 5, 1949 |